US005225128A

United States Patent [19]

Katsuragawa et al.

[11] Patent Number: 5,225,128

[45] Date of Patent: Jul. 6, 1993

[54] METHOD FOR PRODUCING EXTRUDED CERAMIC PRODUCTS

[75] Inventors: Yasuji Katsuragawa, Okazaki; Kenji Arai, Nagoya, both of Japan

[73] Assignee: NGK Insulators, Ltd., Japan

[21] Appl. No.: 501,472

[22] Filed: Mar. 30, 1990

[30] Foreign Application Priority Data

Mar. 31, 1989 [JP] Japan .................................. 1-81159

[51] Int. Cl.[5] ........................ B65B 33/00; C04B 40/00

[52] U.S. Cl. ...................................... 264/79; 264/133; 264/148; 427/154; 427/292; 427/421

[58] Field of Search .................. 264/62, 79, 129, 133, 264/177.11, 177.12, 177.17, 211.11, 211.12, 211.13, 148; 425/94, 97, 107, 131.1, DIG. 115, 104, 106; 427/287, 154, 292

[56] References Cited

U.S. PATENT DOCUMENTS

| | | | |
|---|---|---|---|
| 3,963,817 | 6/1976 | Ballain | 264/56 |
| 4,171,337 | 10/1979 | Rosen et al. | 264/211.11 |
| 4,904,171 | 2/1990 | Greer | 264/133 |

FOREIGN PATENT DOCUMENTS

| | | |
|---|---|---|
| 140507 | 5/1901 | Fed. Rep. of Germany . |
| 210872 | 6/1984 | Fed. Rep. of Germany . |
| 401053 | 8/1909 | France . |
| 629414 | 4/1982 | Switzerland . |
| 13394 | of 1902 | United Kingdom . |

*Primary Examiner*—Jan H. Silbaugh
*Assistant Examiner*—Christopher A. Fiorilla
*Attorney, Agent, or Firm*—Parkhurst, Wendel & Rossi

[57] ABSTRACT

A method of producing extruded ceramic products by extruding a ceramic forming material through an extruding opening, includes a step of coating a liquid, which is nonvolatile at ordinary room temperatures, on a surface of an extruded ceramic product. The liquid is preferably coated on the surface with the aid of capillary action. An apparatus for producing extruded ceramic products includes a forward end portion having an extruding opening for extruding a ceramic forming material and a guide passage for introducing the ceramic forming material into the extruding opening, a liquid supply section provided on the forward end portion for supplying a liquid, which is nonvolatile at ordinary room temperatures, to an outer surface of a product of the ceramic forming material extruded from the extruding opening, and a liquid supply device for supplying the liquid to the liquid supply section.

4 Claims, 4 Drawing Sheets

METHOD FOR PRODUCING EXTRUDED CERAMIC PRODUCTS

BACKGROUND OF THE INVENTION

This invention relates to a method and an apparatus for producing extruded ceramic green products, and more particularly to a method and apparatus for producing ceramic honeycomb structures as catalyst carriers.

In order to produce, for example, ceramic honeycomb structures up to the present, after a ceramic material has been mixed and kneaded in a kneader, the kneaded product was extruded in column-shaped bodies in suitable sizes from a vacuum auger machine and the column-shaped bodies were supplied into a plunger molding machine from which the bodies were extruded.

FIG. 1 illustrates in section a vacuum auger machine to be used for the purpose described. The vacuum auger machine includes a vacuum kneading section having a screw-type mill 23 and a vacuum chamber 24 for kneading the ceramic material to obtain ceramic batches for forming the products, a ceramic batch transfer section having an auger 25 for transferring the ceramic batches in the vacuum chamber 24, and a column-shaped green product forming section having a forming column ring 1 for forming the ceramic batch transferred by the auger 25 into column-shaped green products. These sections are located on a frame 27.

The screw-type mill 23 is used for transferring the ceramic material supplied from a ceramic material supply opening 22 into the vacuum chamber 24, while the ceramic material is being kneaded. In the vacuum chamber 24, bubbles and the like in ceramic batches supplied as kneaded batches for forming are removed and the ceramic batches are loosened when falling by gravity and then supplied to the ceramic batch transfer section.

The ceramic batch supplied into the ceramic batch transfer section is transferred while being compressed by the auger. When the ceramic batch is transferred by the auger, it passes through a grid drum 9 to be crushed and loosened so as to remove laminations included in the ceramic batches. Thereafter, the ceramic batch passes through a guide passage 19 of the forming column ring 1, while being formed into a column-shaped green product which is then extruded at an extruding opening 11 as shown by an arrow A in FIG. 1.

The resultant column-shaped green product is cut in predetermined lengths by a cutter (not shown) provided on a side of the outlet of the forming column ring 1. The column-shaped products of the predetermined lengths are then supplied to a plunger molding machine (not shown) preparatory to a next process. In this case, the column-shaped products must have diameters and lengths permitting the products to be inserted into a cylinder of the plunger molding machine. These column-shaped products are then caused to pass through an extruding die of the plunger molding machine, thereby producing honeycomb structures.

The above explained method is so-called "batch process", wherein the column-shaped products extruded from the extruding opening 11 of the vacuum auger machine shown in FIG. 1 have to be loaded one by one into the plunger molding machine for the next process by means of a movable loading machine.

In this case, however, during this loading process the column-shaped products stay in a stock yard for a period of time until they are loaded into the plunger molding machine. During such an awaiting period, moisture tends to evaporate from surfaces of the column-shaped products to be locally dried and hardened. Moreover, such a drying may take place until they are extruded from a plunger cylinder of the plunger molding machine in the next process.

The dried outer surfaces of the column-shaped products detrimentally affect resultant products having a predetermined shape obtained through an extruding die by an actuation of a ram head by means of a hydraulic plunger. In more detail, the hardened surfaces make rough outer surfaces of extruded honeycomb structures or the hardened portions of ceramic batch mix with inner material of the formed structures to cause strains therein or forming grooves of a forming die are partially clogged with the hardened ceramic material to cause defects in the extruded honeycomb structures.

In the batch process, moreover, the honeycomb structures extruded from the plunger molding machine are left as extruded until next drying process. In the same manner above described, therefore, the honeycomb structures are partially dried and suffer cracks or uniform construction of the structures can not be obtained in the next drying and firing processes so that strains imperatively remain in the structures. In general, the outer surfaces of the extruded products are considerably dried by frictional heat caused by contact resistance between the ceramic batch and extruding dies.

SUMMARY OF THE INVENTION

It is an object of the invention to provide a method and an apparatus for producing extruded ceramic green products, which eliminate the disadvantages of the prior art described above and are capable of preventing drying of outer surfaces of extruded ceramic green products extruded through an extruding opening.

In order to accomplish this object of the invention, the method of producing extruded ceramic products by extruding a ceramic forming material through an extruding opening according to the invention comprises a step of coating a liquid, which is nonvolatile at ordinary room temperatures, on a surface of an extruded ceramic product.

The "liquid which is nonvolatile at ordinary room temperatures" used herein is preferably a liquid having a low vapor pressure at ordinary room temperatures, for example, a mineral oil such as kerosene, light oil, spindle oil or a mixture thereof. In coating, the oil is caused to spread on the surface of an extruded product with the aid of capillary action to form a film of the oil or is jetted from injection nozzles onto the surface. In addition thereto, a spreading blade may be brought in contact with the surface of an extruded product to coat the oil on the surface.

The term "ceramic forming material" used herein is intended to include both a ceramic batch and an extruded ceramic green product once formed in a predetermined shape (for example, a cylindrical formed body). The "extruding opening" used herein may be a simple opening, but includes an opening having forming grooves such as an extruding die.

In another aspect, the apparatus for producing extruded ceramic products according to the invention comprises a forward end portion having an extruding opening for extruding a ceramic forming material and a guide passage for introducing the ceramic forming material into the extruding opening, a liquid supply section provided on the forward end portion for supplying a liquid, which is nonvolatile at ordinary room temperatures, to an outer surface of a product of the ceramic forming material extruded from the extruding opening, and liquid supply means for supplying said liquid to the liquid supply section.

In a further aspect, a liquid coating device for coating a liquid onto extruded ceramic products according to the invention, comprises an extruding opening for extruding a ceramic forming material, a guide passage for introducing the ceramic forming material into the extruding opening, and coating means for coating a liquid, which is nonvolatile at ordinary room temperatures, onto an outer surface of a product of the ceramic forming material extruded from the extruding opening.

According to the method of the invention for producing extruded ceramic formed products, as a liquid, which is nonvolatile at ordinary room temperatures, is coated on surfaces of extruded ceramic formed products, films of the liquid are formed thereon to prevent the moisture in the proximity of the surfaces of the ceramic products from evaporating therefrom. Therefore, the films can prevent local drying, hardening and change of properties of the surfaces of the products so that uniform ceramic products can be obtained.

According to the apparatus of the invention for producing extruded ceramic products, the apparatus comprises at its forward end the liquid supply means to which a liquid, nonvolatile at ordinary room temperatures, is supplied so that the surface of the extruded ceramic product is coated with the liquid as the product is being extruded from the extruding opening of the apparatus.

According to the liquid coating device of the invention, there is provided coating means capable of coating a liquid, which is nonvolatile at ordinary room temperatures, on surfaces of a ceramic product extruded from the extruding opening of the device, so that even after the product has been extruded, the liquid can be coated on surfaces of the extruded ceramic product.

The invention will be more fully understood by referring to the following detailed specification and claims taken in connection with the appended drawings.

DETAILED EXPLANATION OF THE PREFERRED EMBODIMENTS

Figure 1:
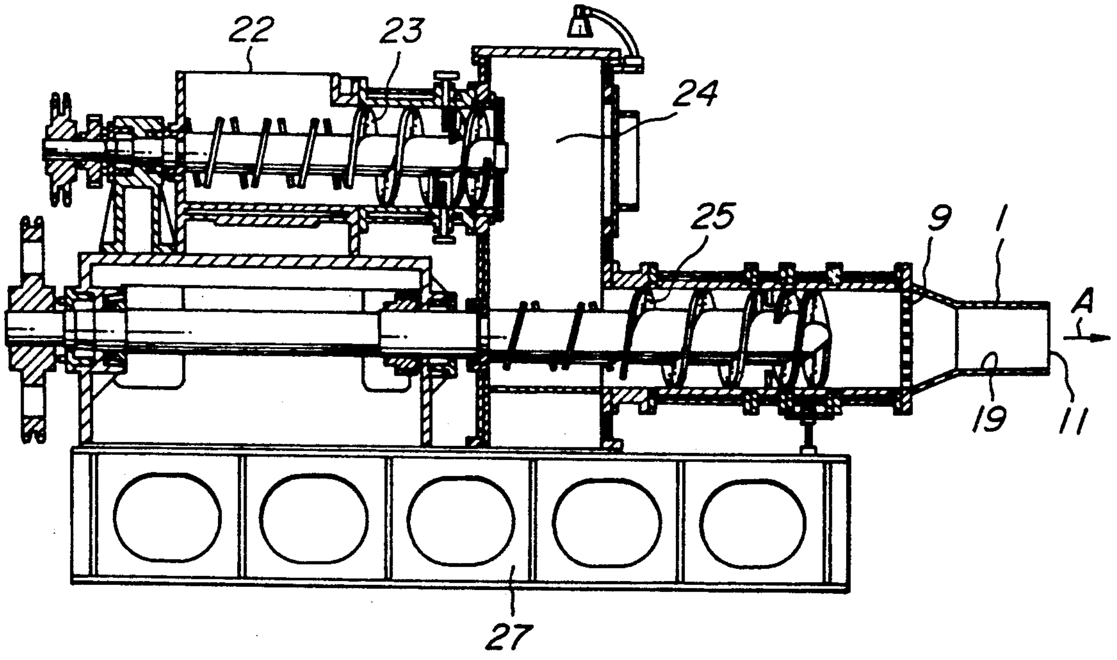
FIG. 1 PRIOR ART
FIG. 1 is a sectional view of a vacuum auger machine of the prior art.
Figure 2:
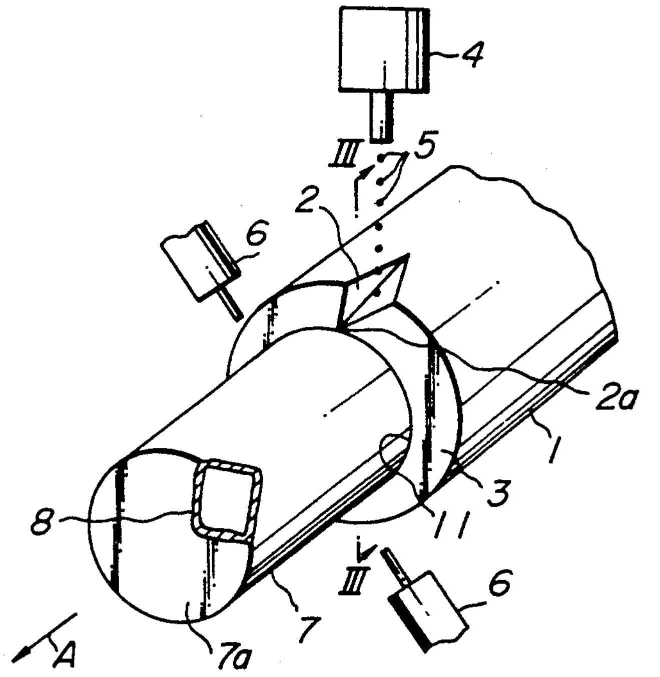
FIG. 2 is a partially removed perspective view illustrating part in the proximity of an extruding opening of a vacuum auger machine to which the invention is applied.
Figure 3:
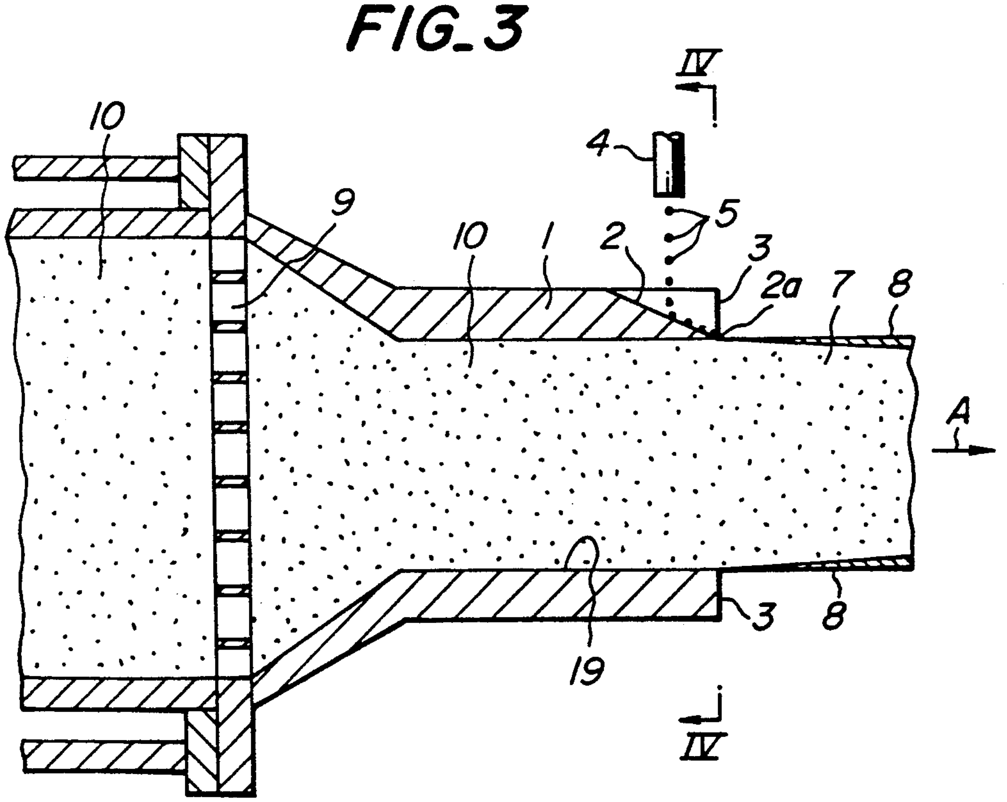
FIG. 3 is a sectional view illustrating the part in the proximity of the extruding opening shown in FIG. 2.
Figure 4:
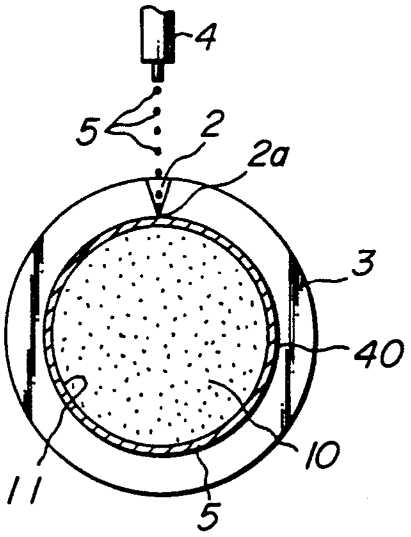
FIG. 4 is a sectional view taken along the line IV—IV in FIG. 3.

An embodiment will be explained, which is an application of the invention to the vacuum auger machine shown in FIG. 1. FIG. 2 is a perspective view illustrating a forward end of a forming column ring 1 partly removed and FIG. 3 is a sectional view of the forming column ring 1. FIG. 4 is a sectional view of the forming column ring 1 taken along the line IV—IV in FIG. 3.

In this embodiment, the forming column ring 1 is formed with a triangular pyramid-shaped notch 2 at an edge of a forward face 3. One end **2*a* of the notch 2 is at an edge of an extruding opening 11 of the forming column ring 1. A pair of jet nozzles 6 are provided in the proximity of the extruding opening 11. Above the notch 2 is fixed constant amount oil supply means 4 from which lower end an oil 5, which is a mixture of kerosene, light oil and spindle oil, is supplied at a constant velocity to the notch 2** under a stable condition.

A ceramic batch 10 is extruded from an auger (not shown) and crushed and loosened by a grid drum 9. The loosened ceramic batch 10 is caused to pass through a guide passage 19 in the forming column ring 1 and then extruded out of the forming column ring 1 shown by an arrow A.

During such an extrusion, the oil 5 supplied from the constant amount oil supply means 4 onto the notch 2 flows down in the notch 2 and arrives at the end **2*a* of the notch 2. As shown in FIG. 4, on the other hand, when the ceramic batch 10 is extruded from the extruding opening 11, there is a clearance 40 (not shown in FIGS. 2 and 3) between an inner wall of the guide passage 19 and the ceramic batch 10. Therefore, the oil 5 extends over a cylindrical outer surface of the ceramic batch 10 with the aid of the capillarity and attached to the whole outer surface so that an oil film 8 is formed and coated on the entire outer surface of the formed product 7, while the ceramic batch 10** is being extruded in the direction of the arrow A.

Figure 5:
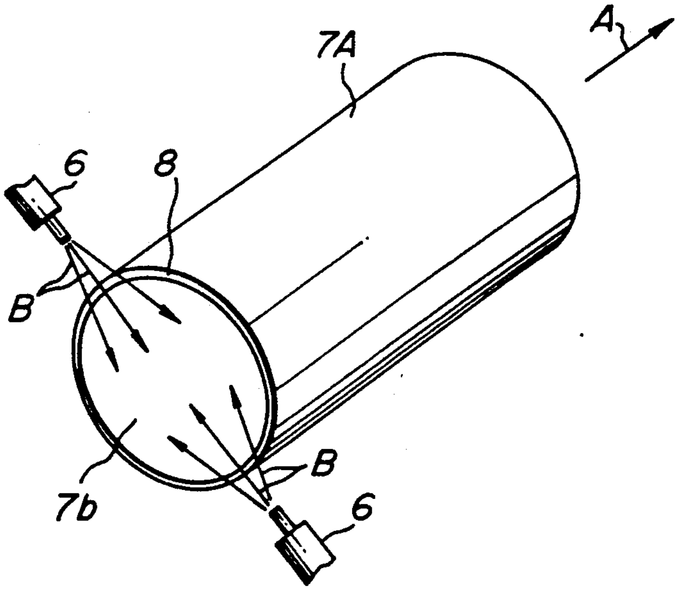
FIG. 5 is a perspective view illustrating a state of jetting an oil against an end face of a column-shaped ceramic product according to the invention.

When the ceramic formed product 7 has been extruded to a predetermined length, it is cut with cutting means such as a wire saw or the like (not shown) to obtain column-shaped products **7*a*** as shown in FIG. 5. The extruding machine and the like are omitted in FIG. 5.

Moreover, an oil is jetted onto an end face **7*b* of the column-shaped formed product 7*a* by means of injection nozzles 6 as shown by arrows B so that the end face 7*b* is coated with an oil film. When an oil film is formed on the forward end face 7*a* of the column-shaped product 7A (FIG. 2), the oil may be sprayed onto the forward end face by the injection nozzles 6**.

According to this embodiment, as the entire column-shaped product 7A is coated with the oil films 8, the moisture included in the column-shaped product 7A is prevented from evaporating so that drying, hardening and change of properties are prevented. Therefore, in forming and treating the column-shaped product 7A in the plunger molding machine, there is no risk of the outer surface of the treated formed product roughening or no risk of hardened ceramic batch mixing in the formed product to cause strains therein or no risk of forming grooves of an extruding die being clogged with the hardened ceramic batch.

Moreover, as the oil films 5 are formed preferably with the aid of capillary action and spraying, thin and uniform oil films can be readily formed in a reliable manner.

Furthermore, it is required only to provide the notch 2 so that the requisite function can be easily obtained in a simple manner without modifying the existing machine. Moreover, as the oil 5 is supplied to the notch 2 under the stable condition, the oil films 5 are uniform in thickness so that the control for forming the oil films is simply effected.

In addition, the lubricating performance between the ceramic batch 10 and the proximity of the extruding opening 11 is improved by the oil films 5 so that the extruding is effected more smoothly.

In the above embodiment, the inclined notch 2 is provided in the proximity of the extruding opening 5. Instead of such a notch 2, another oil supply means may be provided at the forming column ring 1. For example, the forming column ring 1 may be provided with a small aperture 42 tapered inwardly (for example, in the form of a quadrangular pyramid or cone as shown in FIGS. *7a–7d*) and the oil 5 is supplied into a wider end of the small aperture on an outer side to feed the oil through the tapered end of the aperture into the guide passage 19 so that an oil film is formed with the aid of capillary action in the same manner as above described.

Another embodiment will be explained which is an application of the invention to a plunger molding machine.

Figure 6:
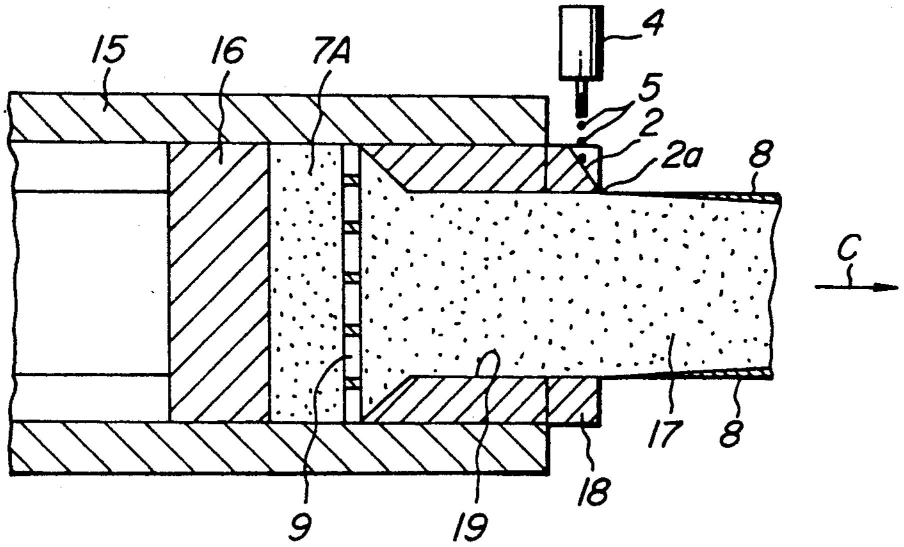
FIG. 6 is a sectional view illustrating part in the proximity of an extruding opening of a plunger molding machine to which the invention is applied.
Figure 7A:
FIGS. 7*a* and 7*b* illustrate a quadrangular pyramid aperture and FIGS. 7*c* and 7*d* illustrate a conical aperture as modifications of liquid supply section according to the invention, respectively.
Figure 7C:
Figure 7B:
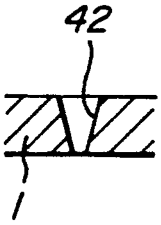
Figure 7D:
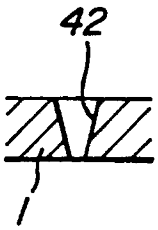

FIG. 6 illustrates the proximity of an extruding die of the plunger molding machine.

A ram head 16 is accommodated in a plunger cylinder 15 so as to be movable interlocking with a hydraulic cylinder (not shown) and to pressurize a column-shaped product 7A. The column-shaped product 7A is moved in a guide passage 19 in a forward end of the plunger cylinder 15 by the pressurizing action of the ram head 16 in a direction shown by an arrow C so that the column-shaped product 7A is formed into a predetermined shape through an extruding die 18 attached to a forward and of the plunger cylinder 15 to obtain a honeycomb formed product 17. It is preferable to provide a grid drum 9 immediately before the extruding die 18 in order to crush and loosen the column-shaped product 7A.

The extruding die 18 is formed with a triangular pyramid-shaped notch *2a* similar to that shown in FIG. 2. Above the notch *2a* is arranged constant amount oil supply means 4. An oil 5 is supplied from an end *2a* of the notch 2 onto an outer surface of the honeycomb formed product 17 by the capillary action to form an oil film on the outer surface of the product 17 in the same manner as above described. Oil films may also be formed on both end faces of the ceramic honeycomb formed product 17 by spraying the oil 5 by the use of injection nozzles above described.

According to this embodiment, the local drying of the surfaces of the honeycomb formed product 17 can be prevented so that uniform contraction in the honeycomb product can be obtained in subsequent drying and firing processes without strains remaining in a sintered product.

In the above embodiment, after column-shaped formed products have been formed, they are loaded one by one into the plunger cylinder to produce the honeycomb formed products. However, after the ceramic bath has been kneaded, the kneaded batch may be directly caused to pass through the extruding die continuously to produce honeycomb formed products which are then dried and fired. In this case, by the use of the arrangement as shown in FIG. 2 or 6, the same effect similar to that shown in FIG. 6 can be obtained.

According to the method of the invention for producing extruded ceramic formed products, as a liquid, which is nonvolatile at ordinary room temperatures, is coated on surfaces of extruded ceramic formed products, films of the liquid prevent the moisture in the proximity of the surfaces of the ceramic products from evaporating therefrom. Therefore, the films can prevent local drying, hardening and change of properties of the surfaces of the products s that uniform ceramic products can be obtained. As a result, roughness and peeling of hardened portions ca be prevented. Moreover, upon applying drying or firing treatment to the extruded ceramic product, it exhibits uniform contraction in its entirety so that strains do not remain in the product.

According to the apparatus of the invention for producing extruded ceramic products, the apparatus comprises at its forward end the liquid supply means to which the liquid, nonvolatile at ordinary room temperatures, is supplied so that the surface of the extruded ceramic product is coated with the liquid as the product is being extruded from the extruding opening of the apparatus.

According to the liquid coating device of the invention, moreover, there is provided coating means capable of coating a liquid, which is nonvolatile at ordinary room temperatures, on surfaces of a ceramic product extruded from the extruding opening of the device, so that even after the product has been extruded, the liquid can be coated on surfaces of the extruded ceramic product.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A method of producing an extruded ceramic product, comprising the steps of:

extruding a ceramic forming material through an extruding opening of a forming die to produce a formed ceramic product and cutting said product to length to form an extruded ceramic product, said extruded ceramic product containing moisture;

coating a liquid on an entire outer surface of the formed ceramic product while the formed ceramic product is being extruded; and coating said liquid on end surfaces of the extruded ceramic product, whereby said liquid prevents drying of moisture from said outer and end surfaces of said extruded ceramic product.

2. The method of claim 1, wherein said liquid is coated on the surface of said extruded ceramic product through capillary action between said surface and said forming die.

3. A method of preventing drying of surfaces of an extruded ceramic product, comprising the steps of:

extruding a ceramic forming material through an extruding opening of a forming die to produce a formed ceramic product and cutting said product to length to form an extruded ceramic product, said extruded ceramic product containing moisture;

coating a liquid on an entire outer surface of the formed ceramic product while the formed ceramic product is being extruded said liquid being non-volatile at ordinary room temperatures; and coating said liquid on end surfaces of the extruded ceramic product, whereby said liquid prevents drying of moisture from said outer and end surfaces of said extruded ceramic product.

4. The method of claim 3, wherein said liquid is coated on the surface of said extruded ceramic product through capillary action between said surface and said forming die.

* * * * *